Patented July 31, 1945

2,380,524

UNITED STATES PATENT OFFICE 2,380,524

PURIFICATION OF ALIPHATIC ETHERS

John C. Hillyer, Bartlesville, Okla., assignor to Phillips Petroleum Company, a corporation of Delaware No Drawing. Application February 21, 1941, Serial No. 380,069

8 Claims. (Cl. 260—616)

This invention relates to a process of purifying organic ethers from which removal of certain detrimental organic impurities is desired.

More specifically it relates to the production from the commercial, or partly purified, grades of ethers of products from which detrimental organic impurities have been essentially completely removed. It relates also to the production of such a highly purified ether in a single step from a crude product.

The various methods used in preparing aliphatic ethers allow a rather wide range of possible organic impurities to be present. Ethers are often prepared from alcohols through the agency of sulfuric acid. Both of these chemicals frequently remain in the ether, the acid in traces, the alcohol often in rather large quantities. Commercially purified ethers almost always contain small percentages of alcohol even after the purification process to which they are subjected. For any reactions in which a hydroxylated compound is detrimental, this alcohol-containing ether will be unsatisfactory and must be further purified. Syntheses involving the Grignard reaction or those in which metallic sodium is used may be cited as examples.

Oxidation of the alcohol, which may occur during the reaction will result in the formation of aldehydes or in case a secondary alcohol is used, of ketones, and further oxidation produces organic or carboxylic acids. These latter, as well as any traces of mineral acid, are detrimental in any case in which hydrogen ion deters the reaction. In other cases the reaction may be sensitive to the active group in aldehydes and ketones, and in this case an ether containing them can not be used as an inert solvent.

Unsaturated hydrocarbons are sometimes present in the ethers, such as the ethylene formed when preparing diethyl ether from alcohol and sulfuric acid. Because of their reactivity these hydrocarbons are also undesirable when using the ether as an inert solvent.

Aldehydes may result from the auto-oxidation of the ether from atmospheric oxygen through the intermediary of so called ether peroxides. These peroxides catalyze further decomposition of the ether, and are in themselves detrimental to certain reactions, or influence the direction of the reaction.

To meet the specifications for motor fuel of very high antiknock characteristics, such as 100 octane aviation fuels and the like, it is ordinarily necessary to add to hydrocarbon fuels an antiknock component, of which diisopropyl ether is an example, of which substantial proportions may be used. It is well known that aldehydes and particularly organic peroxides are highly productive of knocking in internal combustion engines. Consequently an ether containing even small proportions of these impurities would not be suitable for such antiknock addition. Even ethers which have been subjected to purification methods known heretofore may still contain minute quantities of peroxides, which are sufficient to impair the antiknock qualities of the final product.

Known methods of purifying ethers have generally employed an alkaline wash to remove sulfuric acid and the like used in the manufacturing of the ether. This has been followed by purification processes such as oxidation by means of potassium permanganate solutions, or passing over metallic oxides, or by washing with bisulfite solutions followed again by another alkaline wash or by combinations of these methods. This purification has been followed by treatment with a drying agent, such as calcium chloride, followed by a distillation process. These methods have been objectionable in that in order to produce a highly purified ether an inordinately large number of steps have been required with consequent loss of time, smaller recovery of product and undue expense.

In purifying ethers by oxidation with potassium permanganate, ether in acid or neutral solution a sludge of more or less insoluble manganese dioxide is found to form and to collect at the interface. This makes careful separation of the layers impossible and results in a considerable loss of ether in the emulsified, sludgy portion.

Loss of ether also has taken place by solution in the aqueous wash solutions. Diethyl ether is subject also to considerable loss in water washing although the higher ethers, such as diisopropyl, are not appreciably soluble in water. However, when a crude ether is washed with water, extraction of soluble organic impurities, particularly alcohols, into the water layer makes this layer in effect a dilute alcohol solution which has a solvent affect upon the ether. In this way, no matter what ether has been treated, losses in washing crude ethers have been considerable.

It is a further disadvantage of the previously used methods that they do not produce an ether absolutely free from peroxides, ketones, aldehydes and other oxidizable impurities, but instead traces of these impurities can be detected by sensitive test methods in ethers so purified.

Previously such purification methods have not been directed especially toward complete removal of organic peroxides, although partial removal has been incidental to the processes used. Moreover, when it has been desired to produce an ether completely free from peroxides, an additional step has been necessary applied to an already pure ether such as treatment with ferrous sulphate or other reducing agent. Moreover, it is ordinarily possible, by means of the most sensitive testing agents, to detect traces of peroxides even in this ether especially treated for their removal.

Further, ethers are very susceptible to peroxide formation and after an ether has been purified steps must be taken to exclude all air or oxygen from the container, or to inhibit the formation of peroxides, or both. It is also well known that the formation of peroxides is autocatalyzed, that is formation of further peroxide is catalyzed by traces of peroxides already present.

To prevent the formation of peroxides and other oxidation products due to this catalytic reaction it has been customary to add various stabilizing agents to the ether. A large number of such agents are available, among which are copper or copper lined cans, metallic sodium or steel wire. Organic antioxidants such as aromatic amino compounds, hydroxy amines and many others are also used. It is a disadvantage of prior purification processes that the addition of the proportions of these antioxidants required is great enough to make the ether unacceptable for many uses in which the presence of any reactive compounds is not permissible. Without these additive agents however the ether has not been sufficiently stable in storage or use to permit its safe use.

This invention has accordingly for its object the preparation of very pure ethers from crude ethers in a single purification process. It has as a further object the production of very high degree of purity or freedom from organic impurities. Finally, it is also an object of this invention to produce ethers of very high stability and ethers particularly suited to use as antiknock additions to motor fuel.

I have now discovered that the impurities present in crude aliphatic ethers as well as those still remaining in partially purified aliphatic ethers may be removed by treatment according to my invention with a suitable oxidizing agent. I have found the most suitable oxidizing agent to be an aqueous solution of the trioxide of chromium, known also as chromic acid, or chromic anhydride. This has the advantage both of being a very strong oxidizing agent and of requiring the addition of no supplementary acid. Alternately a solution of potassium or sodium or other soluble metallic chromate or dichromate to which has been added sufficient sulfuric acid to make the solution strongly acid may be employed. In these acidified solutions chromic acid is present in solution in ionic form and the mixture functions as a simple chromic acid solution.

When treating a partially purified ether an aqueous solution of chromic acid is preferred. Sufficient chromic acid must be used to complete the oxidation of impurities but only a small excess is required. In treating a crude ether the amount of chromic acid required would be great and in general the use of an acidified chromate solution would be preferred. In purifying crude ethyl ether and the like where a considerable quantity of sulfuric acid may be present in the ether, this acid may furnish part or all of the acid required, thus reducing the expense of treating. It should not be understood, however, that the method is limited by these preferred methods, as either chromate or chromic acid is applicable to both crude and partially purified ethers.

The chromic acid reacts on the impurities in the ether thereby converting them into easily removable forms. Alcohols and ketones may be converted to acetic or other aliphatic acids, or oxidized to gaseous carbon dioxide which readily passes from the liquid mixture. The aliphatic acids in general will dissolve in the aqueous layer and to some extent may increase the solubility of the ether therein. The effect of these carboxyl compounds is small, however, compared to that of the alcohol present before oxidation. Thus, it is an advantage of this invention that the loss of ether due to solution in the aqueous washing liquids is reduced.

A further reduction in washing losses is effected by the presence of inorganic salts in the aqueous layer when using a chromate solution. The solubility of the ether in the aqueous, organic acid containing layer, is sharply reduced due to the well known "salting out" effect. Thus, treating losses may be made almost negligible.

During the treatment the peroxides present in the ether react with the chromic anhydride to form the well known "perchromic acid" which is soluble in the ether, producing a deep blue coloration. This compound, while its exact nature is at present uncertain, is known to be a chromium compound in a high state of oxidation. Its formation is said to take place only in the presence of hydrogen peroxide. Thus, it appears that the ether peroxides may be destroyed by conversion to hydrogen peroxide in contact with the aqueous acid solution, and this may in turn be destroyed by reaction to form perchromic acid. The chemistry of the process, however, is not completely understood.

The ether is then subjected to washing with an alkaline solution to remove products of oxidation. 10% NaOH solution is a satisfactory wash although other strengths or other alkaline solutions may be used. Organic acids are converted to salts which are completely washed out in the aqueous layer, the excess chromic acid is neutralized, and the blue perchromic complex in the ether is destroyed. The latter may be due to formation of a metallic salt soluble only in the aqueous layer, or to complete decomposition of the peroxide structure or to other mechanisms. Its progress may be noted by the rapid disappearance of the blue color from the ether layer. One or more water washes to remove any mechanically held alkaline solution completes the process.

Following this treatment the ether is found to be free from all organic impurities originally present, as well as the organic oxidation products formed. Ether purified by other methods, or by the use of other oxidizing agents such as permanganate solution, while often low in organic impurities still contains peroxides. Particularly, ether from which peroxides have supposedly been removed by permanganate oxidation or reduction by ferrous salts or other means, until they give no test with potassium iodide solution will readily give a blue coloration when treated with aqueous chromic acid solution. This shows the presence of minute amounts of peroxides left in the ethers so purified as it is known that the method is a very sensitive test for their presence. Ether purified by chromic acid oxidation, however, shows no trace of peroxides when tested again with chromic acid solution or any other known test. Removal of other organic impurities such as aldehydes, ketones and alcohols can be shown to be equally complete.

After the previously described treatment, the ether should generally be dried, this being accomplished by drying agents or other means well known to those skilled in the art. During the drying process and in packaging, the ether should be protected from access to air to prevent oxidation to peroxides and thereby loss of part of the advantage gained by the purification. Methods for carrying this out are familiar to those skilled in the art, and although essential, form no part of the present invention.

In carrying out my invention, attention must be given to the temperatures at which the oxidation is made to take place. The oxidation of the peroxides in the ether to perchromic acid requires that the temperature be kept below about 50° C. which is the upper limit for safety. Temperatures below 25° C. are preferred. However, oxidation of the other impurities such as alcohols, etc., does not proceed readily at temperatures below about 15° C., so that the range from about 15° to 35° C. will ordinarily be preferred.

In the case of crude ethers containing considerable quantities of impurities it may be advantageous to operate in two steps. The peroxide may be removed by treatment with chromic acid at temperatures below 25° C. After removing perchromic acid so formed with an alkaline wash, the partially purified ether may be treated with a second portion of chromic acid at a temperature above 25° C., such as somewhat above 50° C. to complete the oxidation of other organic impurities. Generally a temperature below about 100° C. will be found to be satisfactory, but higher temperatures, such as up to about 150° C. or more, may at times be found more expedient, the operation being carried out under suitable pressure. After the preliminary removal of peroxides such high temperatures may safely be employed.

This latter step might if desired be carried out in a vapor phase countercurrent operation. Indeed other phases of the treatment are susceptible to this operation, or to a variety of other methods of operation normally in use in ether purification plants and is not limited to the exact methods of operation above described. My invention is preferably applied to the purification of the lower boiling ethers, especially those containing hydrocarbon radicals of not more than about six carbon atoms. A primary consideration is that the ether itself should not be appreciably attacked under the purification conditions, and care must be taken to control the purification to the end. Ethers with more than six carbon atoms in a hydrocarbon radical may be purified by my process when this radical is essentially unaffected by the treatment. Some mixed aliphatic-carbocyclic ethers, such as methyl, ethyl, isopropyl, or butyl, phenyl ethers or cycloalkyl ethers may also be purified, when necessary, by my invention when the carbocyclic radical is suitably resistant to the action of the chromic acid. Generally substituted alkyl-carbocyclic ethers, such as the alkyl-tolyl ethers, are not sufficiently resistant and can not be purified satisfactorily or efficiently in this manner. The suitability of any ether to purification by the present invention, and the specific optimum conditions for the purification of any particular ether, may be readily determined by trial by one skilled in the art, in the light of the disclosure and discussion contained herein.

It is an advantage of my invention that an ether which is particularly stable in storage is produced. Due to the complete absence of aldehydes and peroxides, the oxidation is not catalyzed and is very slow in beginning even when some air or oxygen is introduced. In cases in which the ether is frequently exposed to air or other cases in which stabilization is preferred, much less of the antioxidant will be required to stabilize the ethers prepared by my process.

The following examples will serve to illustrate the methods and reagents used and the results which may be accomplished by this operation. It is to be understood that the examples are solely for the purpose of illustration, the invention is not to be regarded as necessarily limited to the specific ethers purified, nor to the exact methods employed or results obtained in any case.

*Example I*

500 cc. of diisopropyl ether was removed from a freshly opened 5 gallon can of the commercial product, and was placed in a separatory funnel with 100 cc. of water. Small portions of chromic anhydride were then added and the mixture agitated after each addition. When about 0.3 gm. had been added the oxidation was judged complete as evidenced by the lasting coloration of the aqueous layer.

The mixture was maintained at essentially room temperature (20° C.) although very little cooling was required. The ether layer turned deep blue, and finally was so highly colored as to be opaque.

The aqueous solution was then separated and the ether layer agitated for a few minutes with 100 cc. of a 10% NaOH solution. This layer was drawn off, and the ether washed in the same way twice with 100 cc. portions of water.

A small portion of this ether subjected to a second treatment with chromic anhydride showed no blue coloration indicating that no peroxides were present and that oxidation of impurities was complete.

Samples tested at all stages in the drying process showed no peroxides present. Samples withdrawn from the bottle after 6 months were also free from peroxides.

A sample of the same diisopropyl ether when purified by shaking with 50 cc. portions of potassium permanganate solution until no further reduction occurred, washing with alkali and water and drying over calcium chloride showed the presence of peroxides by the chromic acid method. After distillation over metallic sodium the ether still gave a peroxide test, when bottled over fresh sodium, some reaction gradually occurred as evidenced by the formation of a coating or tarnish on the sodium.

*Example II*

The following example illustrates the utility of the product prepared by my process. Samples of a commercially purified isopropyl ether were treated by the permanganate method and by my chromic acid treatment respectively. These samples were taken in separate 3 necked flasks, provided with reflux condensers and stirrers fitted with mercury seals. To 25 cc. of the ethers was added 1.0 gm. of magnesium trimmings, and the flask was externally heated. When the ether was refluxing, 4.9 gms. of n-propyl bromide dissolved in 275 cc. of the respective samples of isopropyl ether was added to each through a dropping funnel over a period of 40 minutes. Soon after the beginning of this addition the reaction was catalyzed by addition of a small crystal of iodine. After the addition, the mixture was refluxed for 40 minutes or more by external heating.

In the flask containing commercial purified ether no reaction took place, even on repeated catalysis and after six hours refluxing. The flask containing permanganate purified ether showed some tendency to react on repeated catalysis, but the reaction could not be kept going for more than a minute or two and the yield was very small. Using the chromic acid purified, peroxide-free ether, the reaction began easily and progressed vigorously. At the end of 40 minutes refluxing a sample withdrawn and titrated showed 78.2% of $C_3H_7MgBr$ present.

While I have described my invention in a detailed manner and provided examples illustrating modes of execution, and advantages derived in certain uses of the same, it is to be understood that modifications may be made, and that no limitations other than those imposed by the scope of the appended claims are intended.

I claim:

1. The process of removing peroxides and organic impurities from an impure low boiling ether which comprises treating said impure ether with an acidic solution containing the dichromate ion at a temperature not greater than about 25° C., separating the partially purified ether from said acidic solution, washing the partially purified ether with a first aqueous alkaline solution, separating the partially purified ether from said first aqueous alkaline solution, treating the contacted ether a second time with an acidic solution containing the dichromate ion at a temperature above 25° C. to treat the remaining impurities, separating the treated ether from said second acidic solution, and removing the reaction products of said second acidic solution by washing the treated ether with a second aqueous alkaline solution.

2. The process of removing peroxides from an impure low boiling ether which comprises treating said impure ether with an acidic solution containing the dichromate ion, separating the treated ether from said acidic solution, and removing the reaction products of said acidic solution by washing the treated ether with an aqueous alkaline solution.

3. The process of claim 1 in which the ether is diisopropyl ether.

4. The process of claim 1 in which the ether is diethyl ether.

5. The process of claim 2 in which the ether is diisopropyl ether and the acidic solution containing the dichromate ion is a solution of chromic anhydride in water.

6. The process of claim 2 in which the acidic solution containing the dichromate ion is a solution of chromic anhydride in water.

7. A process for purifying diisopropyl ether which contains organic peroxides and other organic impurities, which comprises treating such an impure ether with an aqueous solution of chromic acid at a temperature below approximately 25° C. to react with the organic peroxides, washing the so treated ether with a dilute alkaline solution to remove the reaction products, treating the washed ether with an aqueous solution of chromic acid at a temperature above about 25° C. and below approximately 150° C. to react with the other organic impurities, washing the further treated ether with an alkaline solution to remove the latter reaction products, and subsequently drying the ether so purified.

8. A process for purifying an impure, low boiling ether which contains organic peroxides and other organic impurities, which comprises treating such an impure ether with an aqueous solution of chromic acid at a temperature not greater than about 25° C. to remove organic peroxides, washing the partially purified ether with a dilute alkaline solution, treating the washed ether with an aqueous solution of chromic acid at a temperature above 25° C. to remove the other organic impurities, washing the treated ether with an alkaline solution, and subsequently drying the ether so purified.

JOHN C. HILLYER.